United States Patent
Liu et al.

(10) Patent No.: US 10,415,388 B2
(45) Date of Patent: Sep. 17, 2019

(54) APPARATUS FOR MAKING UNDERGROUND RESERVOIR

(71) Applicant: Sichuan University, Chengdu (CN)

(72) Inventors: Jianfeng Liu, Chengdu (CN); Heping Xie, Chengdu (CN); Yufei Wang, Chengdu (CN); Lingzhi Xie, Chengdu (CN); Ru Zhang, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 101 days.

(21) Appl. No.: 15/825,084

(22) Filed: Nov. 28, 2017

(65) Prior Publication Data

US 2018/0080321 A1 Mar. 22, 2018

Related U.S. Application Data

(62) Division of application No. 14/351,138, filed as application No. PCT/CN2012/074710 on Apr. 26, 2012, now Pat. No. 9,850,756.

(30) Foreign Application Priority Data

May 6, 2011 (CN) .......................... 2011 1 0117074

(51) Int. Cl.
*E21D 13/00* (2006.01)
*B65G 5/00* (2006.01)
*E21B 43/28* (2006.01)
*E21B 43/40* (2006.01)
*C09K 8/38* (2006.01)

(52) U.S. Cl.
CPC ............... *E21D 13/00* (2013.01); *B65G 5/00* (2013.01); *C09K 8/38* (2013.01); *E21B 43/28* (2013.01); *E21B 43/40* (2013.01); *Y02C 10/14* (2013.01)

(58) Field of Classification Search
CPC .. E21D 13/00; B65G 5/00; C09K 8/38; E21B 43/28; E21B 43/40
See application file for complete search history.

(56) References Cited

U.S. PATENT DOCUMENTS 4,358,158 A * 11/1982 Showalter ................. C22B 3/06
299/4
7,156,579 B2 * 1/2007 Castle ....................... B65G 5/00
405/53

* cited by examiner

*Primary Examiner* — Sean E Conley
(74) *Attorney, Agent, or Firm* — Matthias Scholl P.C.; Matthias Scholl

(57) ABSTRACT

A device for constructing an underground reservoir by dissolving limestone using carbon dioxide. The device includes a $CO_2$ storage tank; an absorption tower; a decompression valve; a gas-liquid separator; a crystallizer; a vacuum pump; a buffer tank; a first booster pump; a second booster pump; and a third booster pump. The decompression valve is connected to a limestone layer, and is connected to the gas-liquid separator. The absorption tower is connected between the gas-liquid separator and the limestone layer.

2 Claims, 4 Drawing Sheets

APPARATUS FOR MAKING UNDERGROUND RESERVOIR

CROSS-REFERENCE TO RELATED APPLICATIONS

This application is a divisional of U.S. patent application Ser. No. 14/351,138, filed Apr. 10, 2014, now pending, which is a National Stage Appl. filed under 35 USC 371 of International Patent Application No. PCT/CN2012/074710 with an international filing date of Apr. 26, 2012, designating the United States, and further claims priority benefits to Chinese Patent Application No. 201110117074.X filed May 6, 2011. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

The invention relates to the construction of an underground reservoir or a cave depot, and more particularly to a method and device for construction of an underground reservoir or a cave depot in limestone geology.

Description of the Related Art

Underground energy/waste reservoir can be used for storage of natural gas, oil, and other energy resources, thereby being an indispensable part for a large gas transmission trunk line system. Nuclear waste or carbon dioxide can also be preserved in the underground energy/waste reservoir, which is conducive to national security, energy supply, and environmental improvement. Conventionally, large-scale underground energy/waste reservoirs are generally constructed in mined oil and gas reservoirs, abandoned mines, underground saline aquifers and underground rock salt deposits. Limited by specific geological conditions, the oil and gas pipeline networks and the oil and gas consumption centers are not necessarily located in a geological environment suitable for constructing reservoirs, thereby greatly affecting the development of the underground repository. Thus, it is urgent to develop a universal method for construction of underground reservoirs in various geological zones. Limestone has a wide distribution in the stratum layer, low permeability, and good sealing performance. In the process of diagenesis, limestone is hardly affected by karstification, and thus the natural fissures thereof do not expand, and are even filled with calcite and clay. Therefore, the underground limestone layer has the basic geological conditions for constructing underground energy and waste reservoirs.

U.S. Pat. No. 7,156,579B2 discloses a method for constructing a gas reservoir in limestone layers. The method employs hydrochloric acid to dissolve limestone to construct the gas reservoir. The chemical equation for dissolving limestone is as follows:

$$CaCO_3 + 2HCl \rightarrow CaCl_2 + CO_2 + H_2O$$

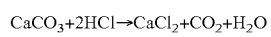

As shown from the chemical equation, a large amount of carbon dioxide is produced in the process of cavern making, which is apt to cause greenhouse effect and environmental pollution if not being dealt properly.

SUMMARY OF THE INVENTION

In view of the above-described problems, it is one objective of the invention to provide a method and a device for construction of an underground reservoir or a cave depot in limestone geology. The method and device, on one hand, solve the problem of greenhouse effect resulting from carbon dioxide emission, and on the other hand, provide a new way for utilizing carbon dioxide.

The main chemical composition of limestone is calcium carbonate ($CaCO_3$), which is soluble in a solution comprising carbon dioxide to yield calcium bicarbonate solution. The chemical equation is as follows:

$$CO_2 + H_2O + CaCO_3 \leftrightharpoons Ca(HCO_3)_2$$

The dissolution process is a reversible reaction. The change of temperature and partial pressure of $CO_2$ can significantly affect the dissolution equilibrium. Lowering the reaction temperature and increasing the partial pressure of $CO_2$ can drive the equilibrium to shift to the right, thereby promoting the dissolution of $CaCO_3$. Conversely, enhancing the reaction temperature and decreasing the partial pressure of $CO_2$ can promote calcium bicarbonate to decompose and yield calcium carbonate, water, and carbon dioxide. Based on the theory, high pressure of carbon dioxide solution is introduced into the limestone layer to dissolve the limestone to yield calcium bicarbonate solution. Thereafter, calcium bicarbonate precipitates by decompression and is decomposed to yield calcium carbonate, water, and carbon dioxide. The gas, liquid, and solid are separated from each other. The collected solution can be used for dissolving carbon dioxide again. The collected carbon dioxide can be used for forming new carbon dioxide solution.

To achieve the above objective, in accordance with one embodiment of the invention, there is provided a method for construction of an underground reservoir by dissolving limestone using carbon dioxide, the method comprising the steps of:

a) drilling a first well and a second well extending from a ground to a limestone layer, disposing at least one channel in the limestone layer to connect the first well and the second well, and inserting a first sleeve and a second sleeve in the first well and the second well, respectively;

b) introducing carbon dioxide having a gas pressure of at least 1 MPa into a carbon dioxide absorption solution having a pressure of at least 1 MPa to yield a carbon dioxide solution, injecting the carbon dioxide solution into the first sleeve and allowing the carbon dioxide solution to flow to the limestone layer through the first sleeve and react with limestone to yield a calcium bicarbonate containing solution whereby forming a cavern comprising solutions, and discharging the calcium bicarbonate containing solution out of the second sleeve;

c) collecting and decompressing the discharged calcium bicarbonate containing solution so that calcium bicarbonate therein is decomposed to yield carbon dioxide, water, and calcium carbonate, performing a gas, liquid, and solid separation, collecting the separated carbon dioxide absorption solution for a new round of dissolution of carbon dioxide, collecting the separated carbon dioxide for a new round of formation of the carbon dioxide solution, and storing the separated calcium carbonate; and d) repeating steps b) and c) until a desired cavern comprising solutions is produced, discharging the solutions in the cavern to yield the underground reservoir.

In a class of this embodiment, the gas pressure of the carbon dioxide introduced into the carbon dioxide absorption solution is between 1 and 15 MPa, and the pressure of the carbon dioxide absorption solution is between 1 and 15 MPa. Preferably, the gas pressure of the carbon dioxide introduced into the carbon dioxide absorption solution is between 2 and 6 MPa, and the pressure of the carbon dioxide absorption solution is between 2 and 6 MPa.

In a class of this embodiment, the carbon dioxide absorption solution is selected from the group consisting of water, between 0.001 and 10 mol/L of sodium chloride solution, between 0.001 and 5 mol/L of sodium oxalate solution, between 0.001 and 5 mol/L of sodium acetate solution, or a mixture thereof.

In a class of this embodiment, the discharged calcium bicarbonate containing solution is decompressed at a temperature of between 20 and 80° C. to have a pressure of between $5 \times 10^5$ Pa and $1 \times 10^2$ Pa so that calcium bicarbonate therein is decomposed to yield carbon dioxide, water, and calcium carbonate. Preferably, the discharged calcium bicarbonate containing solution is decompressed at a temperature of between 20 and 80° C. to have a pressure of between $1.01 \times 10^5$ Pa and $1 \times 10^3$ Pa so that calcium bicarbonate therein is decomposed to yield carbon dioxide, water, and calcium carbonate.

The invention further provides a device for construction of an underground reservoir by dissolving limestone using carbon dioxide, the device comprising: a $CO_2$ storage tank; an absorption tower; a decompression valve; a gas-liquid separator; a crystallizer; a vacuum pump; a buffer tank; a first booster pump; a second booster pump; and a third booster pump.

The absorption tower comprises a $CO_2$ gas inlet, a $CO_2$ gas outlet, a $CO_2$ absorption solution inlet, and a $CO_2$ solution outlet. The $CO_2$ gas inlet of the absorption tower is connected to a gas outlet of the $CO_2$ storage tank via a first pipe. The $CO_2$ absorption solution inlet of the absorption tower is connected to a liquid outlet of the first booster pump via a second pipe. The $CO_2$ gas outlet of the absorption tower is connected to a gas inlet of the third booster pump via a third pipe. A gas inlet of the $CO_2$ storage tank is connected to gas outlets of the second booster pump and the third booster pump via pipes. The gas-liquid separator comprises a $CaHCO_3$ solution inlet, a $CO_2$ gas outlet, and a solution outlet. The $CaHCO_3$ solution inlet is connected to a liquid outlet of the decompression valve via a fourth pipe. The solution outlet of the gas-liquid separator is connected to a solution inlet of the crystallizer via a fifth pipe. The crystallizer comprises the solution inlet, a $CO_2$ gas outlet, a $CO_2$ absorption solution outlet, and a $CaCO_3$ slurry outlet. The $CO_2$ gas outlet is connected to an inlet of the vacuum pump via a sixth pipe. The $CO_2$ absorption solution outlet is connected to a liquid inlet of the first booster pump via a seventh pipe. The seventh pipe connecting the first booster pump and the crystallizer is provided with a connector for supplementing the $CO_2$ absorption solution. A gas inlet of the buffer tank is connected to the $CO_2$ gas outlet of the gas-liquid separator and an outlet of the vacuum pump; and a gas outlet of the buffer tank is connected to a gas inlet of the second booster pump.

In a class of this embodiment, the crystallizer comprises a settling chamber, a stripping chamber, a nozzle, a feeding pump, and a heat exchanger. The settling chamber comprises the $CaCO_3$ slurry outlet and the $CO_2$ absorption solution outlet. The stripping chamber is disposed above and communicates with the settling chamber. The $CO_2$ gas outlet is disposed at the top of the stripping chamber. The nozzle is disposed in the stripping chamber; a liquid inlet pipe of the nozzle is connected to a liquid outlet of the heat exchanger, and a liquid inlet of the heat exchanger is connected to a liquid outlet of the feeding pump, and a liquid inlet of the feeding pump is connected to the solution outlet of the gas-liquid separator.

Advantages of the invention are summarized below:

1. In contrast to the prior art, the method of the invention is more environmentally friendly and provides a new way to utilized carbon dioxide.

2. The byproduct of calcium carbonate produced by the invention is an important industrial raw materials and industrial additives.

3. Through the method, natural gas, oil and other energy storage reservoirs can be constructed in oil and gas pipeline networks or the oil and gas consumption centers, which facilitates the energy supply.

4. The method and device of the invention are easy for industrialization.

BRIEF DESCRIPTION OF THE DRAWINGS

The invention is described hereinbelow with reference to accompanying drawings, in which.

Figure 1:
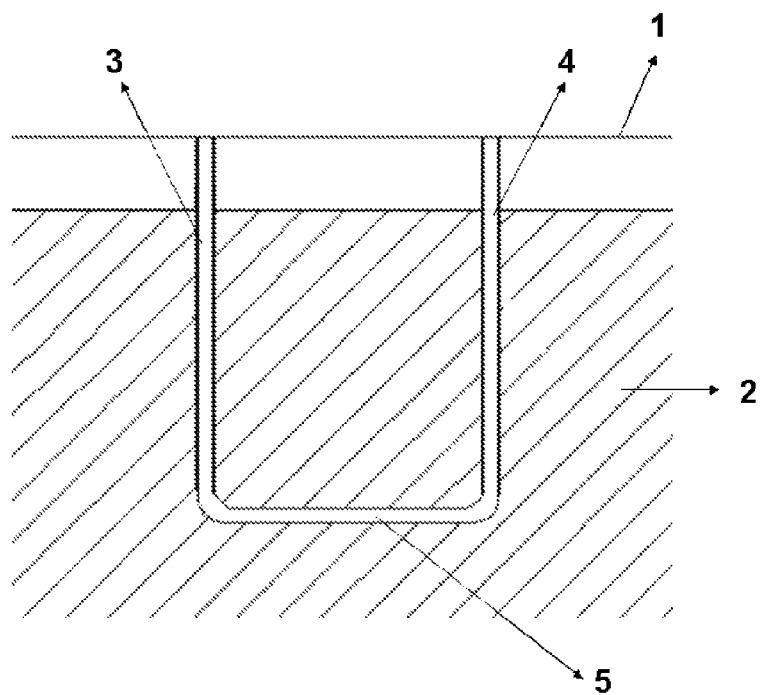
FIG. 1 is an assembly diagram of a first well, a second well, a channel connecting the first well and the second well, a first sleeve, and a second sleeve according to a method for construction of an underground reservoir by dissolving limestone using carbon dioxide according to one embodiment of the invention.

In the drawings, the following reference numbers are used: 1. Ground; 2. Limestone layer; 3. First sleeve; 4. Second sleeve; 5. Channel; 6. Underground reservoir; 7. $CO_2$ storage tank; 8. Absorption tower; 9. Decompression valve; 10. Gas-liquid separator; 11. Crystallizer; 12. First booster pump; 13. Vacuum pump; 14. Buffer tank; 15. Second booster pump; 16. Third booster pump; 17. Settling chamber; 18. Stripping chamber; 19. Nozzle; 20. $CaCO_3$ slurry outlet; 21. $CO_2$ absorption solution outlet; 22. $CO_2$ gas outlet; 23. Feeding pump; 24. Heat exchanger.

DETAILED DESCRIPTION OF THE EMBODIMENTS

For further illustrating the invention, experiments detailing a method and device for construction of an underground reservoir by dissolving limestone using carbon dioxide are described below. It should be noted that the following examples are intended to describe and not to limit the invention.

Example 1

Figure 3:
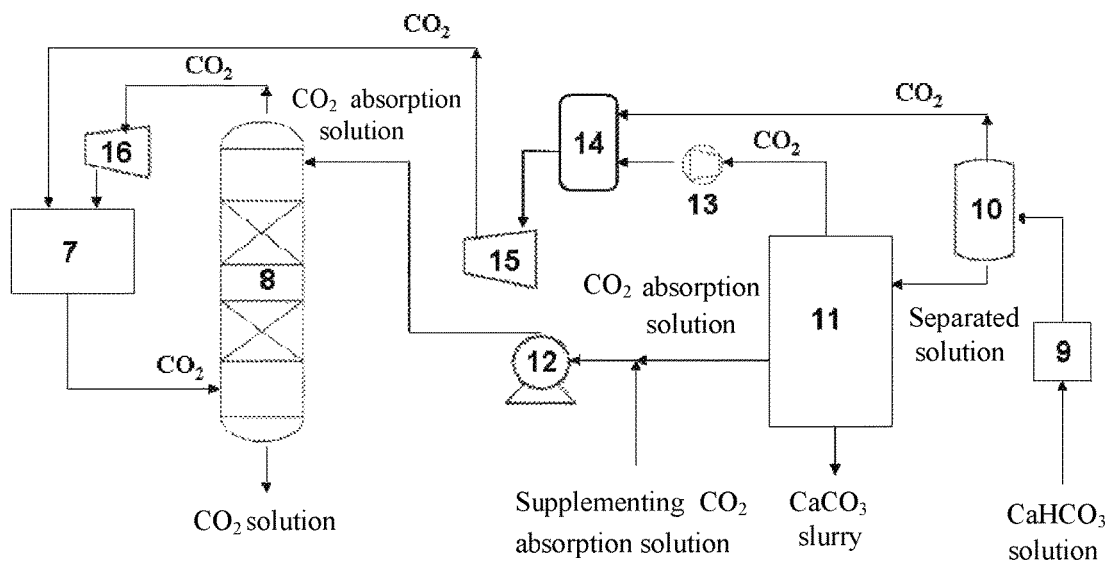
FIG. 3 is a schematic diagram of a device for construction of an underground reservoir by dissolving limestone using carbon dioxide according to one embodiment of the invention.
Figure 4:
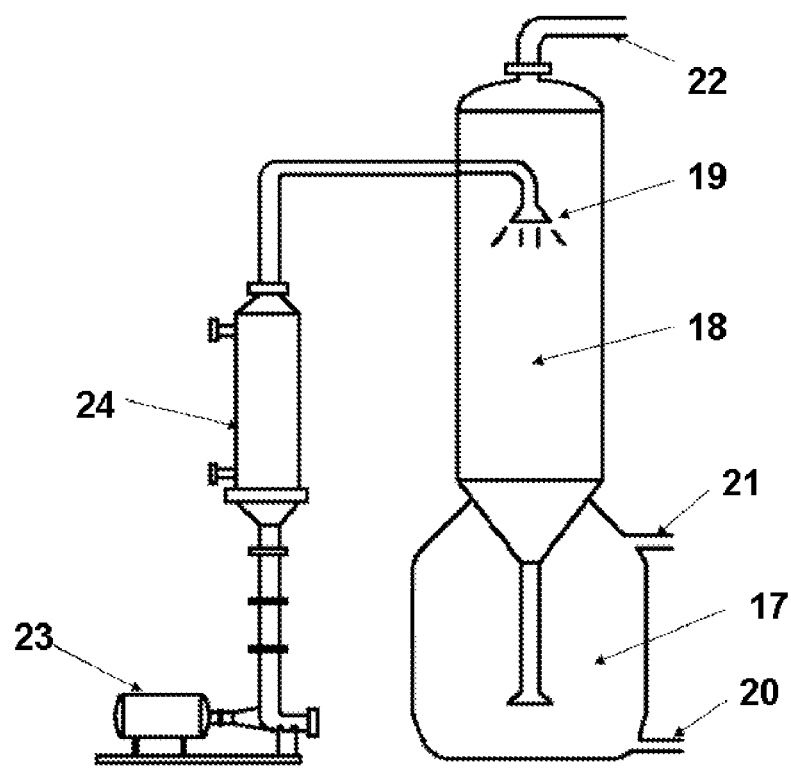
FIG. 4 is a schematic diagram of a crystallizer of a device for construction of an underground reservoir by dissolving limestone using carbon dioxide according to one embodiment of the invention.

As shown in FIG. 3, a device for construction of an underground reservoir by dissolving limestone using carbon dioxide comprises a $CO_2$ storage tank 7; an absorption tower 8; a decompression valve 9; a gas-liquid separator 10; a crystallizer 11; a vacuum pump 13; a buffer tank 14; a first booster pump 12; a second booster pump 15; and a third booster pump 16, all of which employ conventional equipment manufactured in accordance with the design specifications or purchased from chemical markets. As shown in FIG. 4, the crystallizer 11 comprises a settling chamber 17, a stripping chamber 18, a nozzle 19, a feeding pump 23, and a heat exchanger 24. The settling chamber 17 comprises a $CaCO_3$ slurry outlet 20 at the bottom and a $CO_2$ absorption solution outlet 21 at the top. The stripping chamber 18 is disposed above and communicates with the settling chamber 17. The $CO_2$ gas outlet 22 is disposed at the top of the stripping chamber 18. The nozzle 19 is disposed in the stripping chamber 18. A liquid inlet pipe of the nozzle 19 is connected to a liquid outlet of the heat exchanger 24, and a liquid inlet of the heat exchanger 24 is connected to a liquid outlet of the feeding pump 23.

The $CO_2$ storage tank 7, the absorption tower 8, the decompression valve 9, the gas-liquid separator 10, the crystallizer 11, the vacuum pump 13, the buffer tank 14, the first booster pump 12, the second booster pump 15, and the third booster pump 16 are connected as follows.

The absorption tower 8 comprises a $CO_2$ gas inlet, a $CO_2$ gas outlet, a $CO_2$ absorption solution inlet, and a $CO_2$ solution outlet. The $CO_2$ gas inlet of the absorption tower 8 is connected to a gas outlet of the $CO_2$ storage tank 7 via a first pipe. The $CO_2$ absorption solution inlet of the absorption tower 8 is connected to a liquid outlet of the first booster pump 12 via a second pipe. The $CO_2$ gas outlet of the absorption tower 8 is connected to a gas inlet of the third booster pump 16 via a third pipe; a gas inlet of the $CO_2$ storage tank 7 is connected to gas outlets of the second booster pump 15 and the third booster pump 16 via pipes. The gas-liquid separator 10 comprises a $CaHCO_3$ solution inlet, a $CO_2$ gas outlet, and a solution outlet. The $CaHCO_3$ solution inlet is connected to a liquid outlet of the decompression valve 9 via a fourth pipe. The solution outlet of the gas-liquid separator 10 is connected to a solution inlet of the crystallizer 11 via a fifth pipe. The crystallizer 11 comprises the solution inlet, a $CO_2$ gas outlet, a $CO_2$ absorption solution outlet, and a $CaCO_3$ slurry outlet. The $CO_2$ gas outlet is connected to an inlet of the vacuum pump 13 via a sixth pipe. The $CO_2$ absorption solution outlet is connected to a liquid inlet of the first booster pump 12 via a seventh pipe. The seventh pipe connecting the first booster pump 12 and the crystallizer 11 is provided with a connector for supplementing the $CO_2$ absorption solution; and a gas inlet of the buffer tank 14 is connected to the $CO_2$ gas outlet of the gas-liquid separator 10 and an outlet of the vacuum pump 13; and a gas outlet of the buffer tank 14 is connected to a gas inlet of the second booster pump 15.

Example 2

A method for construction of an underground reservoir by dissolving limestone using carbon dioxide by the device in Example 1 is described as follows.

a) A first well and a second well extending from a ground to a limestone layer are drilled. At least one channel 5 is disposed in the limestone layer to connect the first well and the second well. The first sleeve 3 and the second sleeve 4 (as shown in FIG. 1) are disposed in the first well and the second well, respectively. The first sleeve 3 is connected to the $CO_2$ solution outlet of the absorption tower 8 of the device in Example 1, and the second sleeve 4 is connected to the liquid inlet of the decompression valve 9.

b) Carbon dioxide having a gas pressure of 3 MPa in the $CO_2$ storage tank 7 is introduced to the absorption tower where carbon dioxide is absorbed by 2 mol/L of NaCl solution having a pressure of 3 MPa to yield a carbon dioxide solution. Unabsorbed carbon dioxide is discharged from the $CO_2$ gas outlet disposed at the top of the absorption tower 8, pressurized to 3 MPa by the third booster pump 16 and finally returns to the $CO_2$ storage tank 7. The carbon dioxide solution is injected into the first sleeve 3 and flows to the limestone layer through the first sleeve 3 to react with limestone to yield a calcium bicarbonate containing solution. Thus, a cavern comprising solutions is formed. The calcium bicarbonate containing solution is discharged out of the second sleeve 4.

c) The discharged calcium bicarbonate containing solution is collected, decompressed to normal pressure by the decompression valve 9, and then is transported to the gas-liquid separator 10. Thereafter, the carbon dioxide dissolved in the calcium bicarbonate containing solution is discharged from the $CO_2$ gas outlet of the gas-liquid separator 10, transported to the buffer tank 14, and then to the second booster pump 15 via pipes. In the second booster pump 15, the carbon dioxide is pressurized to have a gas pressure of 3 MPa and then transported to the $CO_2$ storage tank 7. The solution is discharged from the solution outlet of the gas-liquid separator 10, and transported to the heat exchanger 24 via the feeding pump 23 of the crystallizer. In the heat exchanger 24, the solution is heated to 40° C.±5° C. and transported to the nozzle 19 disposed in the stripping chamber. The vacuum degree of the stripping chamber 18 and the settling chamber 17 of the crystallizer is controlled at a pressure of between 100 and 500 Pa. The temperature is controlled at 35° C.±5° C. Thereafter, the calcium bicarbonate containing solution is decomposed to yield carbon dioxide, water, and calcium carbonate. By the pumping of the vacuum pump 13, carbon dioxide is discharged from the $CO_2$ gas outlet 22 disposed at the top of the stripping chamber 18, transported to the buffer tank 14 and the second booster pump 15 where the pressure of carbon dioxide is enhanced to 3 MPa, and finally returns to the $CO_2$ storage tank 7. The liquid material enters the settling chamber 17 of the crystallizer and calcium carbonate crystallizes, precipitates, and is discharged from the $CaCO_3$ slurry outlet 20. The NaCl solution is discharged from the $CO_2$ absorption solution outlet 21 disposed at the top of the settling chamber, mixed with a NaCl replenisher, pressurized by the first booster pump 12 to have a pressure of 3 MPa, and transported once again to the absorption tower 8.

Figure 2:
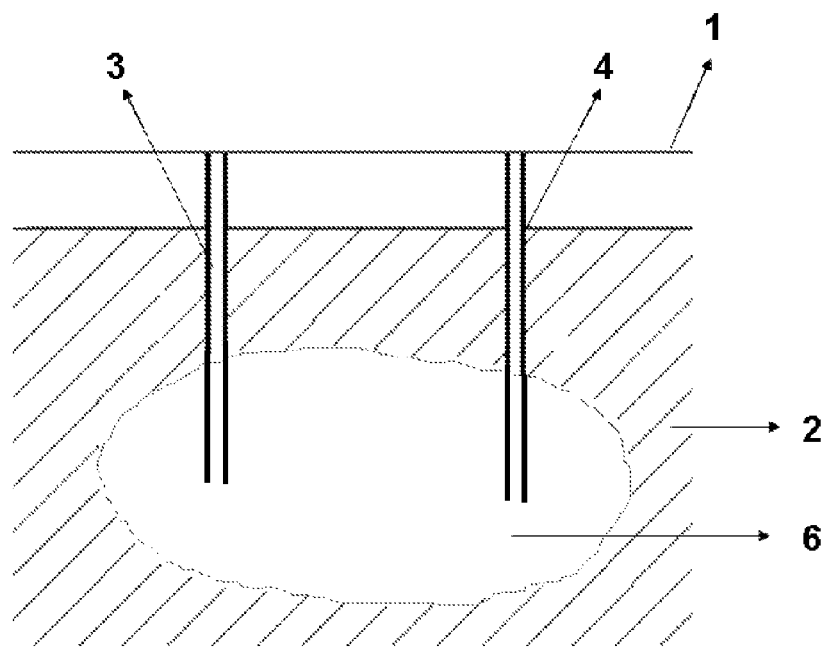
FIG. 2 is a schematic diagram of an underground reservoir constructed according to a method of the invention.

Steps b) and c) are repeated until a desired cavern comprising solutions is produced. Stop injecting the carbon dioxide solution to the first sleeve 3. Compressed air is pumped into the first sleeve 3 so as to expel the solutions in the cavern to yield the underground reservoir 6 (as shown in FIG. 2).

Example 3

A method for construction of an underground reservoir by dissolving limestone using carbon dioxide by the device in Example 1 is described as follows.

a) The step is the same as that in Example 2.

b) Carbon dioxide having a gas pressure of 5 MPa in the $CO_2$ storage tank 7 is introduced to the absorption tower where carbon dioxide is absorbed by 0.05 mol/L of sodium acetate solution having a pressure of 5 MPa to yield a carbon dioxide solution. Unabsorbed carbon dioxide is discharged from the $CO_2$ gas outlet disposed at the top of the absorption tower 8, pressurized to 5 MPa by the third booster pump 16 and finally returns to the $CO_2$ storage tank 7. The carbon dioxide solution is injected into the first sleeve 3 and flows to the limestone layer through the first sleeve 3 to react with limestone to yield a calcium bicarbonate containing solution. Thus, a cavern comprising solutions is formed. The calcium bicarbonate containing solution is discharged out of the second sleeve 4.

c) The discharged calcium bicarbonate containing solution is collected, decompressed to normal pressure by the decompression valve 9, and then is transported to the gas-liquid separator 10. Thereafter, the carbon dioxide dissolved in the calcium bicarbonate containing solution is discharged from the $CO_2$ gas outlet of the gas-liquid separator 10, transported to the buffer tank 14, and then to the second booster pump 15 via pipes. In the second booster pump 15, the carbon dioxide is pressurized to have a gas pressure of 5 MPa and then transported to the $CO_2$ storage tank 7. The solution is discharged from the solution outlet of the gas-liquid separator 10, and transported to the heat exchanger 24 via the feeding pump 23 of the crystallizer. In the heat exchanger 24, the solution is heated to 45° C.±5° C. and transported to the nozzle 19 disposed in the stripping chamber. The stripping chamber 18 and the settling chamber 17 work in the normal pressure (the vacuum pump in the example is in nonuse). The temperature is controlled at 40° C.±5° C. Thereafter, the calcium bicarbonate containing solution is decomposed to yield carbon dioxide, water, and calcium carbonate. By the pumping of the vacuum pump 13, carbon dioxide is discharged from the $CO_2$ gas outlet 22 disposed at the top of the stripping chamber 18, transported to the buffer tank 14 and the second booster pump 15 where the pressure of carbon dioxide is enhanced to 5 MPa, and finally returns to the $CO_2$ storage tank 7. The liquid material enters the settling chamber 17 of the crystallizer and calcium carbonate crystallizes, precipitates, and is discharged from the $CaCO_3$ slurry outlet 20. The NaCl solution is discharged from the $CO_2$ absorption solution outlet 21 disposed at the top of the settling chamber, mixed with a NaCl replenisher, pressurized by the first booster pump 12 to have a pressure of 5 MPa, and transported once again to the absorption tower 8.

Steps b) and c) are repeated until a desired cavern comprising solutions is produced. Stop injecting the carbon dioxide solution to the first sleeve 3. Compressed methane is pumped into the first sleeve 3 so as to expel the solutions in the cavern to yield the underground reservoir 6 (as shown in FIG. 2).

The invention is not limited to above examples. For example, the gas pressure of carbon dioxide to be introduced to the $CO_2$ absorption solution can be any pressure between 1 and 15 MPa, the pressure of the $CO_2$ absorption solution can be any pressure between 1 and 15 MPa. The carbon dioxide absorption solution is selected from the group consisting of sodium chloride solution, sodium oxalate solution, sodium acetate solution, or a mixture thereof.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A device for constructing an underground reservoir by dissolving limestone using carbon dioxide, the device comprising:
   a) a $CO_2$ storage tank;
   b) an absorption tower;
   c) a decompression valve;
   d) a gas-liquid separator;
   e) a crystallizer;
   f) a vacuum pump;
   g) a buffer tank;
   h) a first booster pump;
   i) a second booster pump; and
   j) a third booster pump;
wherein
   the absorption tower comprises a $CO_2$ gas inlet, a $CO_2$ gas outlet, a $CO_2$ absorption solution inlet, and a $CO_2$ solution outlet;
   the $CO_2$ gas inlet of the absorption tower is connected to a gas outlet of the $CO_2$ storage tank via a first pipe; the $CO_2$ absorption solution inlet of the absorption tower is connected to a liquid outlet of the first booster pump via a second pipe; the $CO_2$ gas outlet of the absorption tower is connected to a gas inlet of the third booster pump via a third pipe;
   a gas inlet of the $CO_2$ storage tank is connected to a gas outlet of the second booster pump and a gas outlet of the third booster pump via pipes;
   the gas-liquid separator comprises a $CaHCO_3$ solution inlet, a $CO_2$ gas outlet, and a solution outlet; the $CaHCO_3$ solution inlet is connected to a liquid outlet of the decompression valve via a fourth pipe; the solution outlet of the gas-liquid separator is connected to a solution inlet of the crystallizer via a fifth pipe;
   the crystallizer comprises the solution inlet, a $CO_2$ gas outlet, a $CO_2$ absorption solution outlet, and a $CaCO_3$ slurry outlet; the $CO_2$ gas outlet is connected to an inlet of the vacuum pump via a sixth pipe; the $CO_2$ absorption solution outlet is connected to a liquid inlet of the first booster pump via a seventh pipe; the seventh pipe connecting the first booster pump and the crystallizer is provided with a connector for supplementing the $CO_2$ absorption solution; and
   a gas inlet of the buffer tank is connected to the $CO_2$ gas outlet of the gas-liquid separator and an outlet of the vacuum pump; and a gas outlet of the buffer tank is connected to a gas inlet of the second booster pump.

2. The device of claim 1, wherein
   the crystallizer comprises a settling chamber, a stripping chamber, a nozzle, a feeding pump, and a heat exchanger;
   the settling chamber comprises the $CaCO_3$ slurry outlet and the $CO_2$ absorption solution outlet; the stripping chamber is disposed above and communicates with the settling chamber; the $CO_2$ gas outlet is disposed at the top of the stripping chamber; and
   the nozzle is disposed in the stripping chamber; a liquid inlet pipe of the nozzle is connected to a liquid outlet of the heat exchanger, and a liquid inlet of the heat exchanger is connected to a liquid outlet of the feeding pump, and a liquid inlet of the feeding pump is connected to the solution outlet of the gas-liquid separator.

* * * * *